US012585236B2

(12) United States Patent
Shimizu et al.

(10) Patent No.: US 12,585,236 B2
(45) Date of Patent: Mar. 24, 2026

(54) SCADA WEB HMI CLIENT DEVICE AND SCADA WEB HMI SYSTEM

(71) Applicant: TMEIC CORPORATION, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 390 days.

(21) Appl. No.: 18/554,800

(22) PCT Filed: Mar. 30, 2022

(86) PCT No.: PCT/JP2022/016156
§ 371 (c)(1),
(2) Date: Oct. 11, 2023

(87) PCT Pub. No.: WO2023/188162
PCT Pub. Date: Oct. 5, 2023

(65) Prior Publication Data
US 2024/0201646 A1 Jun. 20, 2024

(51) Int. Cl.
G05B 19/042 (2006.01)
G06F 21/30 (2013.01)
(Continued)

(52) U.S. Cl.
CPC ........... G05B 19/042 (2013.01); G06F 21/30 (2013.01); G06F 21/31 (2013.01); G06F 21/62 (2013.01);
(Continued)

(58) Field of Classification Search
CPC ......... H04L 67/12; H04L 41/28; H04L 63/10; H04L 63/083; G06F 21/30; G06F 21/31;
(Continued)

(56) References Cited

U.S. PATENT DOCUMENTS 6,463,352 B1 * 10/2002 Tadokoro ........... G05B 19/4187
702/33
7,240,360 B1 * 7/2007 Phan ....................... G06F 21/82
726/28
(Continued)

FOREIGN PATENT DOCUMENTS

CN 101727470 A * 6/2010
JP 2017-027211 A 2/2017
(Continued)

OTHER PUBLICATIONS

Masetti, Lorenzo, et al. "A scalable and homogenous web-based solution for presenting CMS control system data." THCOAAB01, proceedings ICALEPCS (2013). (Year: 2013).*
(Continued)

*Primary Examiner* — Michael Simitoski
(74) *Attorney, Agent, or Firm* — XSENSUS LLP

(57) ABSTRACT

A SCADA web HMI client device comprises a processor and a memory. The memory stores a user access level, image data for an HMI screen, and screen access authority information, all received from a web server. The screen access authority information includes an operation access level of the HMI screen and operation permission/prohibition of the HMI screen by the web browser. The processor draws the HMI screen in an operable state on the web browser in a case where the user access level is greater than or equal to the operation access level and where operation of the HMI screen by the web browser is permitted. The processor draws the HMI screen in an inoperable state on the web browser in a case where the user access level is less than the operation access level or operation of the HMI screen by the web browser is not permitted.

8 Claims, 7 Drawing Sheets

(51) Int. Cl.
  *G06F 21/31*        (2013.01)
  *G06F 21/62*        (2013.01)
  *H04L 9/40*         (2022.01)
  *H04L 41/28*        (2022.01)
  *H04L 67/12*        (2022.01)

(52) U.S. Cl.
  CPC ........ *G06F 21/6218* (2013.01); *G06F 21/629*
      (2013.01); *H04L 41/28* (2013.01); *H04L*
      *63/083* (2013.01); *H04L 63/10* (2013.01);
      *H04L 67/12* (2013.01); *G05B 2219/24215*
                                      (2013.01)

(58) Field of Classification Search
  CPC .... G06F 21/62; G06F 21/6218; G06F 21/629;
      G06F 21/84; G06F 3/048; G06F 3/0481;
      G06F 3/04847; H04N 1/4433; G09G
      2358/00; G06Q 50/04; Y02P 90/02;
      G05B 19/042; G05B 2219/24215; G05B
      2219/31472; G05B 2219/13144; G05B
      23/02; G05B 23/0216
  See application file for complete search history.

(56)              References Cited

U.S. PATENT DOCUMENTS

| | | | | |
|---|---|---|---|---|
| 8,931,084 | B1 * | 1/2015 | Paya | H04L 67/34 |
| | | | | 713/160 |
| 8,935,753 | B1 * | 1/2015 | Cha | G16H 40/20 |
| | | | | 726/4 |
| 9,477,936 | B2 * | 10/2016 | Lawson | H04L 67/12 |
| 11,733,683 | B2 * | 8/2023 | Thomsen | G06Q 10/10 |
| | | | | 707/600 |
| 2005/0155043 | A1 * | 7/2005 | Schulz | G05B 23/0216 |
| | | | | 700/83 |
| 2005/0262549 | A1 * | 11/2005 | Ritt | H04L 63/083 |
| | | | | 726/1 |
| 2006/0015195 | A1 * | 1/2006 | Lehman | G05B 19/4186 |
| | | | | 700/83 |
| 2006/0026672 | A1 * | 2/2006 | Braun | G05B 19/042 |
| | | | | 726/9 |
| 2013/0125233 | A1 * | 5/2013 | Bush | G05B 23/0216 |
| | | | | 726/19 |
| 2014/0365937 | A1 * | 12/2014 | Brusilovsky | G09G 5/02 |
| | | | | 715/771 |
| 2015/0277404 | A1 * | 10/2015 | Maturana | G06F 9/451 |
| | | | | 700/83 |
| 2015/0371016 | A1 * | 12/2015 | Nielsen | G06F 21/6218 |
| | | | | 726/27 |

| | | | | |
|---|---|---|---|---|
| 2016/0050225 | A1 * | 2/2016 | Carpenter | G06F 21/577 |
| | | | | 726/25 |
| 2016/0179085 | A1 * | 6/2016 | Seitz | G05B 19/414 |
| | | | | 700/180 |
| 2016/0219054 | A1 * | 7/2016 | Nagata | G06F 21/445 |
| 2016/0349931 | A1 * | 12/2016 | Walter | G06F 3/04847 |
| 2017/0090463 | A1 * | 3/2017 | Wang | G05B 19/0426 |
| 2017/0126843 | A1 * | 5/2017 | Pantea | G06F 9/4415 |
| 2017/0169197 | A1 * | 6/2017 | Jiang | G06F 21/30 |
| 2018/0314996 | A1 | 11/2018 | Singh et al. | |
| 2018/0356945 | A1 * | 12/2018 | Gannon | G06F 3/04883 |
| 2019/0014085 | A1 * | 1/2019 | Soliman | H04L 63/0263 |
| 2019/0020659 | A1 * | 1/2019 | Loni | H04L 63/105 |
| 2020/0073604 | A1 * | 3/2020 | Oikawa | G06F 3/1255 |
| 2021/0208562 | A1 * | 7/2021 | Fujieda | G09G 5/363 |
| 2021/0373546 | A1 * | 12/2021 | Fujieda | G05B 23/0272 |
| 2022/0309135 | A1 * | 9/2022 | Kawczynski | G06F 21/41 |
| 2023/0084106 | A1 * | 3/2023 | Sobol | G07C 9/29 |
| | | | | 340/5.61 |

FOREIGN PATENT DOCUMENTS

| | | | | |
|---|---|---|---|---|
| JP | 2019-114090 A | 7/2019 | | |
| WO | WO-2020090028 A1 * | 5/2020 | | G09G 5/363 |
| WO | WO-2020090033 A1 * | 5/2020 | | G05B 19/058 |
| WO | WO-2021015022 A1 * | 1/2021 | | G05B 19/4185 |

OTHER PUBLICATIONS

Zecevic, Goran. "Web based interface to SCADA system." POWERCON'98. 1998 International Conference on Power System Technology. Proceedings (Cat. No. 98EX151). vol. 2. IEEE, 1998. (Year: 1998).*

Dantas, Daniel T., et al. "Enabling cybersecurity features using a layered connectivity to promote secure remote operation and maintenance." IET Conference Proceedings CP785. vol. 2021. No. 6. Stevenage, UK: The Institution of Engineering and Technology, 2021. (Year: 2021).*

Gowdanakatte, Shwetha, Indrakshi Ray, and Siv Hilde Houmb. "Attribute based access control model for protecting programmable logic controllers." Proceedings of the 2022 ACM Workshop on Secure and Trustworthy Cyber-Physical Systems. 2022. (Year: 2022).*

Office Action issued on Oct. 9, 2025, in corresponding Indian patent Application No. 202317066342, 6 pages.

International Search Report and Written Opinion mailed on Jun. 21, 2022, received for PCT Application PCT/JP2022/016156, filed on Mar. 30, 2022, 10 pages including English Translation.

* cited by examiner

24

| USERNAME | PASSWORD | USER ACCESS LEVEL |
|----------|----------|-------------------|
| USER01 | ******** | 5000 |
| USER02 | ******** | 3000 |

27

| SCREEN NAME | OPERATION ACCESS LEVEL | DISPLAY ACCESS LEVEL | WEB BROWSER NAME | |
|---|---|---|---|---|
| | | | B1_1 | B2_1 |
| G10 | 3000 | 3000 | P | NP |
| G11 | 5000 | 3000 | P | NP |
| G12 | 5000 | 5000 | NP | P |

P:  PERMITTED
NP:NOT PERMITTED

| SCREEN NAME | SPECIFIC PART NAME | SPECIFIC OPERATION ACCESS LEVEL | SPECIFIC DISPLAY ACCESS LEVEL | WEB BROWSER NAME | |
|---|---|---|---|---|---|
| | | | | B1_1 | B2_1 |
| G11 | 1_PL | 1 | 1 | | |
| G12 | 2_PL | 1 | 1 | | |

P:  PERMITTED
NP:NOT PERMITTED

SCADA WEB HMI CLIENT DEVICE AND SCADA WEB HMI SYSTEM

CROSS-REFERENCE TO RELATED APPLICATION

The present application is based on PCT filing PCT/JP2022/016156, filed Mar. 30, 2022, the entire contents of which is incorporated herein by reference.

FIELD

The present disclosure relates to a SCADA web HMI client device and a SCADA web HMI system.

BACKGROUND

A SCADA (Supervisory Control And Data Acquisition) is known as a mechanism for supervising and controlling a social infrastructure system. The social infrastructure system includes a steel rolling system, a power transmission and transformation system, a water and sewage treatment system, a building management system, a road system, and the like.

The SCADA is a type of industrial control system, and performs system supervision, process control, and data collection by a computer. The SCADA requires quick responsiveness (real-time property) corresponding to processing performance of the system.

The SCADA generally includes the following sub-systems.

(1) HMI (Human Machine Interface)

An HMI is a mechanism that presents data on an object process (supervisory object device) to an operator, and enables the operator to supervise and control the process. For example, PTL 1 discloses a SCADA HMI including an HMI screen operating on a SCADA client.

(2) Supervisory Control System

A supervisory control system collects signal data (PLC signal) on a process, and transmits a control command (control signal) to the process. The supervisory control system includes a PLC (Programmable Logic Controller) and the like.

(3) Remote Input/Output Device (Remote Input Output)

A remote input/output device is connected to a sensor installed in the supervisory object device, converts a signal of the sensor into digital data, and transmits the digital data to the supervisory control system.

(4) Communication Base

A communication base connects the supervisory control system and the remote input/output device.

As an example of the SCADA HMI sub-system, PTL 1 discloses a system including an HMI client device and an HMI server device. In the existing SCADA disclosed in PTL 1, the HMI server device transmits data received from the PLC to the HMI client device. The HMI client device includes a computer main body, input devices such as a keyboard and a mouse, and a monitor, and displays one HMI screen on the monitor.

Note that the applicant is aware of the following literatures including the above-described literature, as literatures related to the present disclosure.

CITATION LIST

Patent Literature

[PTL 1] JP 2017-27211 A
[PTL 2] JP 2019-114090 A

SUMMARY

Technical Problem

In the HMI sub-system disclosed in PTL 1 described above, one HMI client device is necessary to display one HMI screen. In terms of reduction of a cost, an installation space, a failure rate, and a communication load, it is desirable that a plurality of HMI screens can be simultaneously used in one HMI client device.

As a result of study and research, the inventors of the present application have developed a browser-based SCADA HMI sub-system. This makes it possible to realize an HMI screen as a web application operating on a web browser. Accordingly, a plurality of web browsers can be executed on one HMI client device, and the HMI screen can be displayed on each of the web browsers.

Consideration will be given to application of such a browser-based SCADA HMI sub-system to a large-scale plant such as a production line of an industrial system. The large-scale plant is divided into a plurality of sections, and each of the sections includes an operation room (pulpit). An HMI client device that executes the web browser drawing the HMI screen is disposed in each of the operation rooms. It is necessary for an operator in each of the operation rooms to operate the HMI screen of the own section; however, the operator should not operate the HMI screens other than the HMI screen of the own section. Therefore, it is desirable to set operation authority to each of the web browsers (operation place) in units of HMI screens. Note that, in the large-scale plant, there are several thousands to several tens thousands of operation signals, and it is not possible to manage the operation authority in units of parts disposed on the HMI screen. Therefore, the operation authority is basically set in units of HMI screens. Further, there are needs for setting different authorities corresponding to the login users in units of HMI screens even in the same web browser.

An object of the present disclosure, which has been made to solve the above-described issues, is to provide a SCADA web HMI client device and a SCADA web HMI system that enable setting of operation authority to each of web browsers in units of HMI screens, and that enable setting of operation authority to each of users in units of HMI screens.

Solution to Problem

A first aspect relates to a SCADA web HMI client device. A SCADA web HMI client device executes at least one web browser communicating with a web server.

The SCADA web HMI client device comprises a processor, a memory, and a monitor.

The memory stores a user access level corresponding to a login user, image data for an HMI screen for supervising an industrial plant and screen access authority information, all received from the web server. The screen access authority information including an operation access level of the HMI screen and operation permission/prohibition of the HMI screen by the web browser.

The processor executes the web browser displayed on the monitor.

The processor draws the HMI screen in an operable state on the web browser in a case where the user access level is greater than or equal to the operation access level of the HMI screen and where operation of the HMI screen by the web browser is permitted (the web browser is permitted to operate the HMI screen).

The processor draws the HMI screen in an inoperable state on the web browser in a case where the user access level is less than the operation access level of the HMI screen or where operation of the HMI screen by the web browser is not permitted (the web browser is not permitted to operate the HMI screen).

A second aspect further includes the following characteristics in addition to the first aspect.

The memory further stores exceptional access authority information. The exceptional access authority information includes a specific operation access level of a specific part on the HMI screen. The specific part is a part of a plurality of parts on the HMI screen.

The processor draws the specific part in the operable state on the web browser in a case where the user access level is less than the operation access level of the HMI screen, and where the user access level is greater than or equal to the specific operation access level of the specific part, and wherein operation of the HMI screen by the web browser is permitted. The processor further draws parts other than the specific part among the plurality of parts in the inoperable state on the web browser in the above case.

A third aspect further includes the following characteristics in addition to the first aspect.

The screen access authority information further includes a display access level of the HMI screen.

The processor prohibits to draw the HMI screen on the web browser in a case where the user access level is less than the display access level of the HMI screen.

The processor draws the HMI screen in the operable state on the web browser in a case where the user access level is greater than or equal to the display access level of the HMI screen, and where the user access level is greater than or equal to the operation access level of the HMI screen, and where operation of the HMI screen by the web browser is permitted.

The processor draws the HMI screen in the inoperable state on the web browser in a case where the user access level is greater than or equal to the display access level of the HMI screen, and where the user access level is less than the operation access level of the HMI screen or operation of the HMI screen by the web browser is not permitted.

A fourth aspect further includes the following characteristics in addition to the third aspect.

The memory further stores exceptional access authority information. The exceptional access authority information includes a specific display access level of a specific part on the HMI screen. The specific part is a part of a plurality of parts on the HMI screen.

The processor is configured to draw, on the web browser, the specific part in an operation state based on the operation access level of the HMI screen and the operation permission/prohibition of the HMI screen by the web browser, in a case where the user access level is less than the display access level of the HMI screen and where the user access level is greater than or equal to the specific display access level of the specific part. The processor is further configured to prohibit drawing of parts other than the specific part among the plurality of parts on the web browser, in the above case.

A fifth aspect relates to a SCADA web HMI system.

The SCADA web HMI system comprises: an HMI server device configured to execute a web server; and an HMI client device configured to execute at least one web browser communicating with the web server.

The HMI server device includes a server processor and a server memory.

The server memory stores login information, image data for an HMI screen for supervising an industrial plant, and screen access authority information. The login information includes a user access level corresponding to a login username. The screen access authority information includes an operation access level of the HMI screen and operation permission/prohibition of the HMI screen by the web browser.

The server processor is configured to execute the web server that transmits the user access level corresponding to the login username, the image data, and the screen access authority information to the web browser, in response to a login request including the login username from the web browser.

The HMI client device includes a client processor, a client memory, and a monitor.

The client memory stores the user access level corresponding to the login user, the image data, and the screen access authority information, all received from the web server.

The client processor is configured to execute the web browser displayed on the monitor.

The client processor is configured to draw the HMI screen in an operable state on the web browser in a case where the user access level is greater than or equal to the operation access level of the HMI screen and where operation of the HMI screen by the web browser is permitted.

The client processor is configured to draw the HMI screen in an inoperable state on the web browser in a case where the user access level is less than the operation access level of the HMI screen or operation of the HMI screen by the web browser is not permitted.

A sixth aspect further includes the above fifth aspect in addition to the second aspect.

A seventh aspect further includes the above fifth aspect in addition to the above third aspect.

An eighth aspect further includes the above seventh aspect in addition to the above fourth aspect.

Advantageous Effects of Invention

According to the present disclosure, the operation authority can be set to each of the web browsers in units of HMI screens, and the operation authority can be set to each of the users in units of HMI screens. This makes it possible to manage drawing states of the respective HMI screens by combining conditions of both of the web browser (operation place) and the user.

BRIEF DESCRIPTION OF DRAWINGS

FIG. 5 is a diagram to explain an example of an exceptional access authority table according to the embodiment.

DESCRIPTION OF EMBODIMENTS

Figure 1:
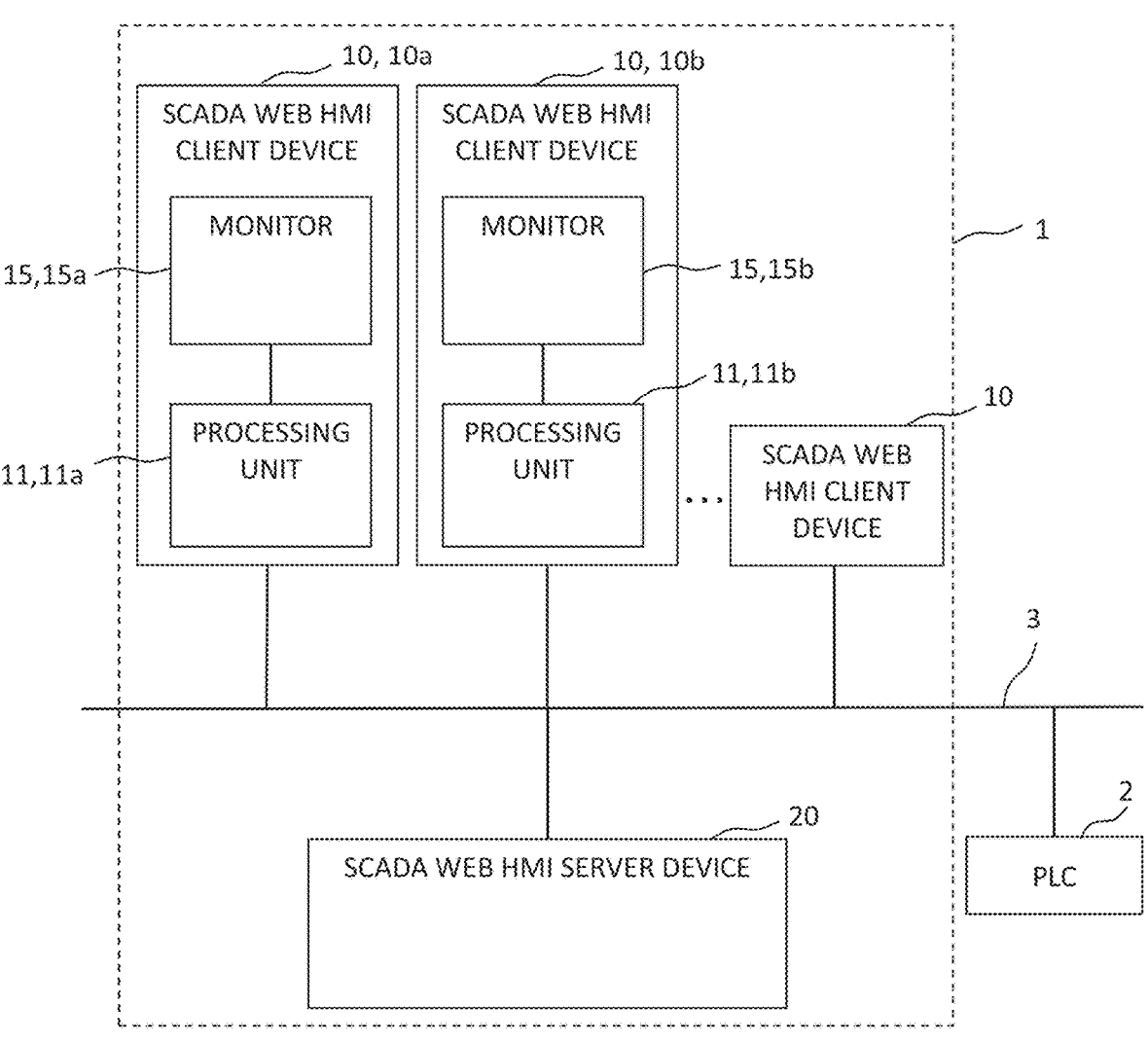
FIG. 1 is a diagram to explain a configuration example of a SCADA web HMI system according to an embodiment.

An embodiment of the present invention will be described in detail below with reference to drawings. Note that elements common to each of the drawings are denoted by the same reference numerals, and repetitive descriptions are omitted.

Embodiment

1. Entire System

FIG. 1 is a diagram for describing a system configuration of a SCADA. The SCADA includes, as sub-systems, a SCADA web HMI system 1 serving as a human machine interface (HMI), a programmable logic controller 2 (hereinafter, PLC 2) serving as a supervisory control system, a communication device (not illustrated), and an RIO (not illustrated).

Descriptions about the PLC 2 (supervisory control system), the communication device (communication base), and the RIO are omitted because those are already described in Background. A supervisory object device (not illustrated) is a sensor, an actuator, or the like, which is a component of an industrial plant to be supervised and controlled.

The SCADA web HMI system 1 and the PLC 2 are connected through an information LAN 3. The PLC 2, the communication device, and the RIO are connected through a control LAN (not illustrated). The SCADA is connected to the supervisory object device through the PLC 2 or the RIO.

The PLC 2 periodically transmits a packet including block data to the information LAN 3 by multicast or broadcast. The block data is a set of PLC signals. One piece of block data includes several tens to several hundred PLC signals. Further, the PLC 2 receives a control signal relating to the supervisory object device from an HMI server device 20.

2. SCADA Web HMI System

The SCADA web HMI system 1 includes, as an example, a SCADA web HMI server device (hereinafter, referred to as HMI server device 20) and at least one SCADA web HMI client device (hereinafter, referred to as HMI client device 10).

Figure 2:
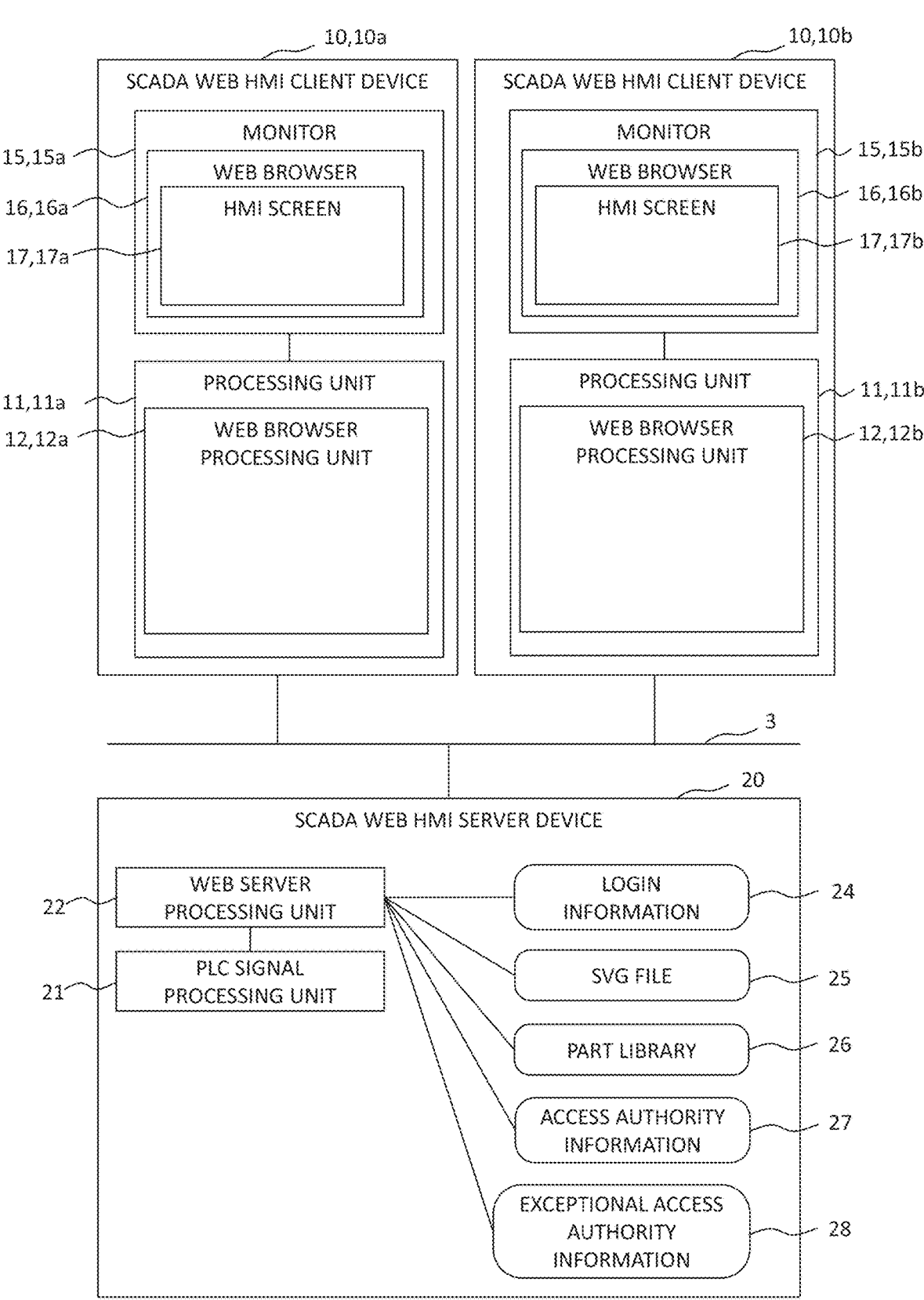
FIG. 2 is a block diagram illustrating overview of functions held by the SCADA web HMI system according to the embodiment.

FIG. 2 is a diagram for describing a configuration example of the SCADA web HMI system 1 according to the embodiment. The SCADA web HMI system 1 illustrated in FIG. 2 includes the HMI server device 20 and a plurality of HMI client devices 10 that are mutually connected through the information LAN 3. In FIG. 2, as an example, a first HMI client device 10a and a second HMI client device 10b are illustrated; however, in a case where it is unnecessary to distinguish the first HMI client device 10a and the second HMI client device 10b from each other, the first HMI client device 10a and the second HMI client device 10b are each simply referred to as the HMI client device 10.

2-1. Configuration of HMI Server Device

Figure 7:
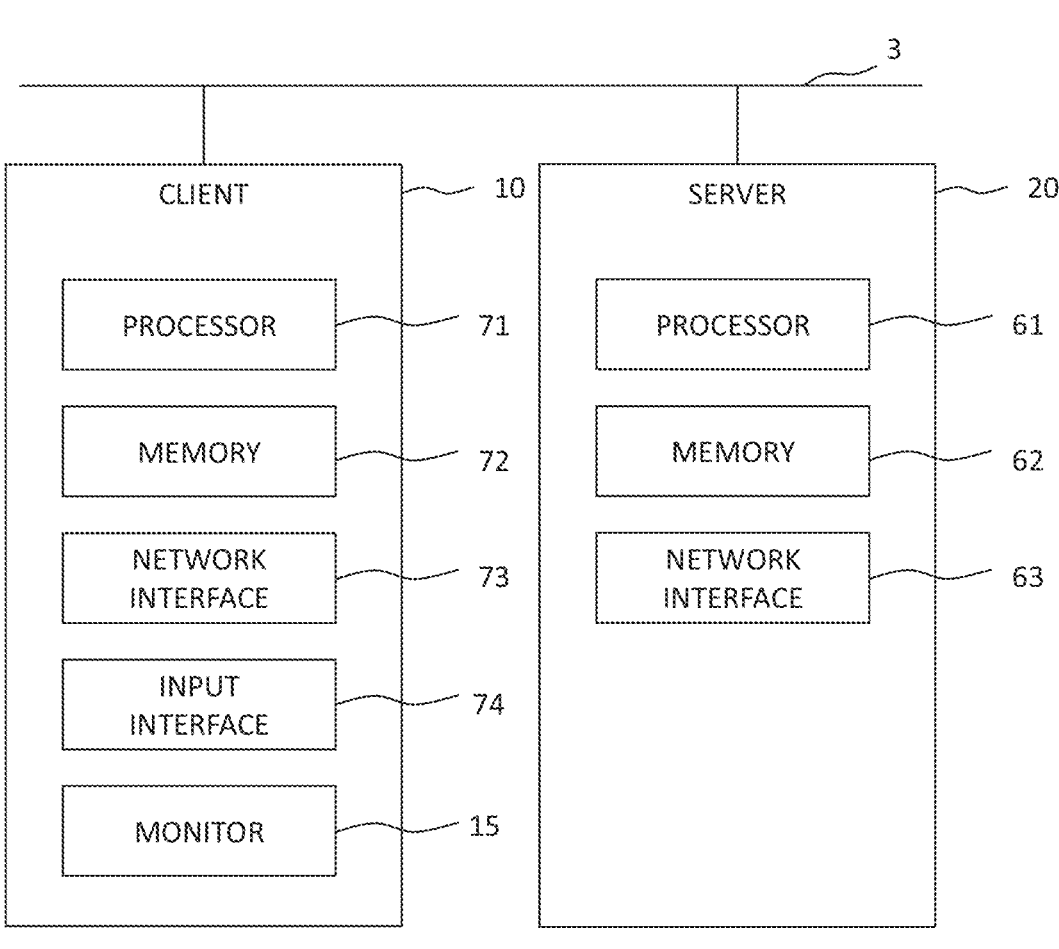
FIG. 7 is a block diagram illustrating hardware configuration examples of the SCADA web HMI system according to the embodiment.

The HMI server device 20 illustrated in FIG. 2 receives the PLC signals from the PLC 2 (FIG. 1), transmits the control signal to the PLC 2, and executes a web server. As illustrated in FIG. 7 described below, the HMI server device 20 includes a processor 61 that performs various kinds of processing, and a memory 62 for storing various kinds of information. The processor 61 functions as a PLC signal processing unit 21 and a web server processing unit 22 by executing programs stored in the memory 62. The PLC signal processing unit 21 and the web server processing unit 22 can mutually transmit/receive data through inter-process communication. The memory 62 stores login information 24, a SVG (Scalable Vector Graphics) file 25, a part library 26, access authority information 27 (screen access authority information), and exceptional access authority information 28.

The PLC signal processing unit 21 transmits the PLC signals periodically received from the PLC 2, to each of web browsers 16 (web browser processing units 12) through the web server processing unit 22. Further, the PLC signal processing unit 21 transmits control signals received from each of the web browsers 16 through the web server processing unit 22, to the PLC 2.

The web server processing unit 22 can communicate with the web browsers 16 (web browser processing units 12) of each of the HMI client devices 10 by using HTTP (Hypertext Transfer Protocol), HTTPS (Hypertext Transfer Protocol Secure), or WebSocket.

The web server processing unit 22 receives a login request (including username and password) from each of the web browsers 16 (each of web browser processing units 12). In a case where the received username and the received password match with a username and a password registered in the login information 24, login is successful, and a user access level corresponding to the login username is transmitted to the corresponding web browser 16.

Figure 3:
FIG. 3 is a diagram to explain an example of a user table according to the embodiment.

FIG. 3 is a diagram illustrating an example of the login information 24. The login information 24 is a list in which the username, the password, and the user access level are associated with one another. In the example illustrated in FIG. 3, a user access level "5000" is set to a username "USER01". A user access level "3000" is set to a username "USER02".

Further, the web server processing unit 22 transmits contents in response to a request from each of the web browsers 16 (each of web browser processing units 12). The contents include an HTML file (not illustrated), the SVG file 25 that is image data for each HMI screen for supervising the industrial plant, the part library 26 in which operation for each type of part is described, the access authority information 27, and the exceptional access authority information 28.

The part library 26 includes a set of scripts in which operation for each type of part is described. Each of the scripts is a JavaScript® program defined for each type of part. Each of the scripts is given parameter values (for example, user access level, and information set in access authority information 27 and exceptional access authority information 28) as necessary, and is executable on each of the web browsers 16.

The access authority information 27 includes an operation access level and a display access level of each of HMI screens 17, and operation permission/prohibition (whether operation authority is given (whether operation is permitted) and whether operation authority is not given (whether operation is not permitted)) of each of the HMI screens 17 by the web browsers 16.

Figure 4:
FIG. 4 is a diagram to explain an example of an access authority table according to the embodiment.

FIG. 4 is a diagram illustrating an example of the access authority information 27. The access authority information 27 is a list in which a screen name, the operation access level, the display access level, operation permission/prohibition for each of the web browsers are associated with one another. "G10", "G11", and "G12" are screen names of the respective HMI screens 17. A value of the operation access level and a value of the display access level within a range from "1" to "9999" are set to each of the screen names. "B1_1" is a web browser name of a first web browser 16a executed by the first HMI client device 10a. "B2_1" is a web browser name of a second web browser 16b executed by the second HMI client device 10b. As an example, the web browser name is a name obtained by combining a device name of the computer and a monitor number. In the example illustrated in FIG. 4, the web browser 16a having the web browser name "B1_1" is permitted to operate the HMI screens having the screen names "G10" and "G11" (operation authority is given), and is not permitted to operate the HMI screen having the screen name "G12" (operation authority is not given). Further, the web browser 16b having the web browser name "B2_1" is permitted to operate the HMI screen having the screen name "G12" (operation authority is given), and is not permitted to operate the HMI screens having the screen names "G10" and "G11".

As described above, in principle, the access authority is set in units of HMI screens by the access authority information 27. However, even in the HMI screen, the access authority of which is not given, a specific part that should be exceptionally operable exists, for example, an emergency stop button. Therefore, it is desirable to exceptionally set the access authority in units of parts. Therefore, setting in the exceptional access authority information 28 is preferentially adopted rather than setting in the access authority information 27.

The exceptional access authority information 28 includes a specific operation access level and a specific display access level of a specific part in each of the HMI screens 17. The specific part is a part of a plurality of parts in each of the HMI screens 17. Note that the exceptional access authority information 28 may include operation permission/prohibition of a specific part by each of the web browsers 16.

FIG. 5 is a diagram illustrating an example of the exceptional access authority information 28. The exceptional access authority information 28 is a list in which the screen name, a specific part name, the specific operation access level, the specific display access level, and operation permission/prohibition for each of the web browser names are associated with one another. A specific operation access level "1" and a specific display access level "1" are set to a specific part "1_PL" on the screen name "G11". A specific operation access level "1" and a specific display access level "1" are set to a specific part "2_PL" on the screen name "G12". For example, the specific parts "1_PL" and "2_PL" are emergency stop buttons. When the minimum value "1" is set to the operation access level, each of the specific parts "1_PL" and "2_PL" can be operated by anyone.

Note that a blank cell means that the setting is the same as the setting in the access authority information 27. In other words, in FIG. 5, the setting about the operation permission/prohibition for each of the web browser names follows the access authority information 27. Further, the access authority of parts other than the specific part follows the setting in the access authority information 27. In other words, the access authority of parts other than the specific part "1_PL" on the HMI screen having the screen name "G11" and the access authority of parts other than the specific part "2_PL" on the HMI screen having the screen name "G12" follow the setting in the access authority information 27.

2-2. Configuration of HMI Client Device

Referring back to FIG. 2, the description is continued. Each HMI client device 10 (10a or 10b) includes a processing circuit 11 (11a or 11b) (including processor 71 that performs various kinds of processing and memory 72 for storing various kinds of information, illustrated in FIG. 7 described below), and a monitor 15 (15a or 15b). The processor 71 functions as the web browser processing unit 12 (12a or 12b) by executing programs stored in the memory 72. In the present specification, in a case where the reference numerals 10a to 17a and the reference numerals 10b to 17b are not distinguished from each other, the reference numerals 10 to 17 are simply used.

The web browser processing unit 12 is performed for each web browser 16. The web browser processing unit 12 displays a login screen at startup of the web browser 16, and transmits a login request including the username and the password input in the login screen, to the web server processing unit 22. The web browser processing unit 12 receives a signal including the user access level corresponding to the username (login user) from the web server processing unit 22, and stores the signal in the memory 72.

The web browser processing unit 12 draws the HMI screen 17 to supervise and control the industrial plant on the web browser 16. Each of the HMI screens 17 is switched to another HMI screen 17 by operation of the operator. A plurality of parts is arranged in each of the HMI screens 17. Examples of the parts include an operation part to transmit a control signal to the PLC 2 in response to operation by the operator, a display parts changed in display state (numerical value, characters, color, or shape) in response to the received PLC signal, and a screen transition part to switch the HMI screen to another HMI screen.

At startup, the web browser processing unit 12 (web browser 16) receives the HTML file, the SVG file 25, the part library 26, the access authority information 27, the exceptional access authority information 28, and the like all described above, from the web server processing unit 22, and stores the received files and information in the memory 72. The web browser 16 draws the HMI screen 17 in which the parts are arranged, based on the received files and information.

The web browser processing unit 12 determines a drawing state of the HMI screen 17 on the web browser 16, based on the user access level and the access authority information 27.

(1) In a case where the user access level is less than the display access level of the HMI screen 17, the web browser processing unit 12 prohibits drawing of the HMI screen 17 on the web browser 16. In this case, an error message is displayed on the web browser 16.

(2) In a case where the user access level is greater than or equal to the display access level of the HMI screen 17, the user access level is greater than or equal to the operation access level of the HMI screen 17, and the web browser 16 is permitted to operate the HMI screen 17, the web browser processing unit 12 draws the HMI screen 17 in an operable state on the web browser 16.

(3) In a case where the user access level is greater than or equal to the display access level of the HMI screen 17, and the user access level is less than the operation access level of the HMI screen 17 or the web browser 16 is not permitted to operate the HMI screen 17, the web browser processing unit 12 draws the HMI screen 17 in an inoperable state on the web browser 16.

In the inoperable state, each of the parts on the HMI screen 17 does not accept execution operation (for example, mouse click) by the operator. In the operable state, each of the parts on the HMI screen 17 accepts execution operation by the operator, and transmits a control signal corresponding to the operation to the HMI server device 20.

Further, in a case where information about the specific part on the HMI screen 17 is set in the exceptional access authority information 28, the setting in the exceptional access authority information 28 is preferentially adopted rather than the setting in the access authority information 27.

(4) In a case where the user access level is less than the specific display access level of the specific part, the web browser processing unit 12 prohibits drawing of the specific part on the web browser 16. Further, the web browser processing unit 12 draws the parts other than the specific part on the web browser 16 based on the setting in the access authority information 27.

(5) In a case where the user access level is greater than or equal to the specific display access level of the specific part, the user access level is greater than or equal to the specific operation access level of the specific part, and the web browser 16 is permitted to operate the HMI screen 17, the web browser processing unit 12 draws the specific part in an operable state on the web browser 16. Further, the web browser processing unit 12 draws the parts other than the specific part on the web browser 16 based on the setting in the access authority information 27.

(6) In a case where the user access level is greater than or equal to the specific display access level of the specific part, and the user access level is less than the specific operation access level of the specific part or the web browser 16 is not permitted to operate the HMI screen 17, the web browser processing unit 12 draws the specific part in an inoperable state on the web browser 16. Further, the web browser processing unit 12 draws the parts other than the specific part on the web browser 16 based on the setting in the access authority information 27.

3. Example of Processing by HMI Client Device

Figure 6:
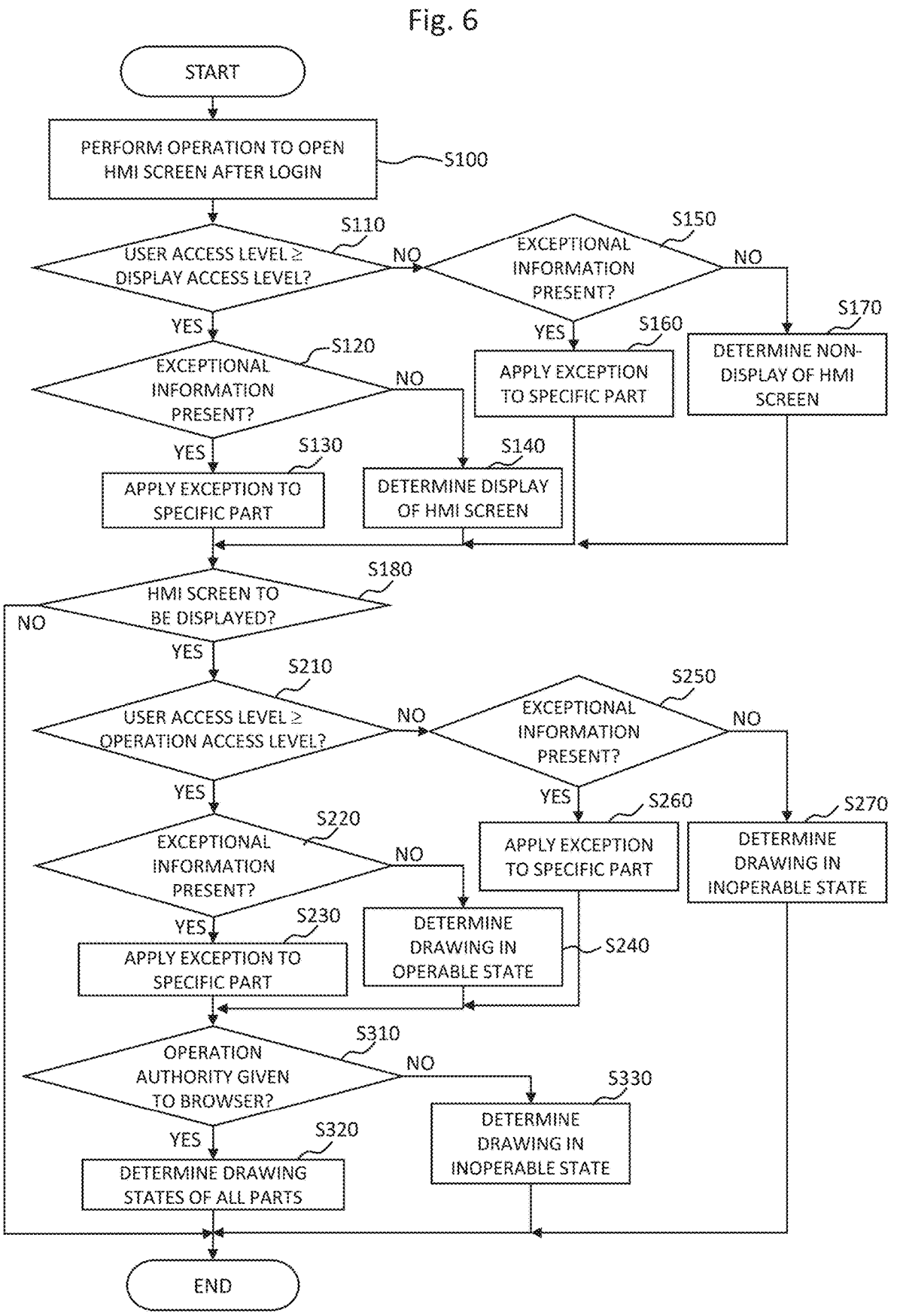
FIG. 6 is a flowchart to explain a web browser processing unit according to the embodiment.

Processing of drawing the HMI screen 17 by the web browser 16 is specifically described with reference to FIG. 3 to FIG. 6. FIG. 3 is a diagram illustrating an example of the above-described login information 24. FIG. 4 is a diagram illustrating an example of the above-described access authority information 27. FIG. 5 is a diagram illustrating an example of the above-described exceptional access authority information 28. FIG. 6 is a flowchart for describing an example of the processing by the HMI client device 10.

In step S100 in FIG. 6, the HMI client device 10 executes the web browser 16. When login is successful, the web browser 16 acquires the user access level and the contents corresponding to the login user from the server, and stores the user access level and the contents in the memory 72. The contents include the HTML file, the SVG file 25, the part library 26, the access authority information 27, and the exceptional access authority information 28, all described above.

In steps S110 to S170, the web browser processing unit 12 determines a display state of the HMI screen 17 based on the display access level set in the access authority information 27.

In step S110, the web browser processing unit 12 refers to the access authority information 27, and compares the user access level of the login user with the display access level of the HMI screen 17. In a case where the user access level is greater than or equal to the display access level of the HMI screen 17, processing in step S120 is performed.

In step S120, the web browser processing unit 12 determines whether the information about the specific part on the HMI screen 17 is set in the exceptional access authority information 28. In a case where the specific display access level about the specific part on the HMI screen 17 is set in the exceptional access authority information 28, processing in step S130 is performed.

In step S130, the web browser processing unit 12 preferentially adopts the specific display access level of the specific part rather than the display access level of the HMI screen 17. More specifically, the web browser processing unit 12 compares the user access level with the specific display access level of the specific part on the HMI screen 17. In a case where the user access level is greater than or equal to the specific display access level of the specific part, display of the specific part is determined. In contrast, in a case where the user access level is less than the specific display access level of the specific part, non-display of the specific part is determined. The display states of the parts on the HMI screen 17 other than the specific part are determined based on the setting in the access authority information 27. Thereafter, processing in step S180 is performed.

A specific example will be described. A case where login is performed with the username "USER01" in the web browser name "B1_1" and the HMI screen "G11" is opened will be described. As illustrated in FIG. 3, the user access level of the username "USER01" is "5000". As illustrated in FIG. 4, the display access level of the HMI screen "G11" is "3000". In other words, the user access level "5000" of USER01 is greater than or equal to the display access level "3000" of G11. Further, in the exceptional access authority information 28, the specific display access level "1" is set to the specific part "1_PL" of G11. The user access level "5000" is greater than or equal to the specific display access level "1" of the specific part "1_PL". Therefore, display of the specific part "1_PL" is determined. Accordingly, display of all of the parts in the HMI screen 17 is determined.

In step S120 described above, in a case where the specific display access level about the specific part on the HMI screen 17 is not set in the exceptional access authority information 28, processing in step S140 is performed. In step S140, display of all of the parts in the HMI screen 17 is determined. Thereafter, processing in step S180 is performed.

In step S110 described above, in a case where the user access level is less than the display access level of the HMI screen 17, processing in step S150 is performed.

In step S150, the web browser processing unit 12 determines whether the information about the specific part on the HMI screen 17 is set in the exceptional access authority information 28. In a case where the information about the specific part on the HMI screen 17 is set in the exceptional access authority information 28, processing in step S160 is performed.

In step S160, the web browser processing unit 12 preferentially adopts the specific display access level of the specific part rather than the display access level of the HMI screen 17. More specifically, the web browser processing unit 12 compares the user access level with the specific display access level of the specific part on the HMI screen 17. In a case where the user access level is greater than or equal to the specific display access level of the specific part, display of the specific part is determined. In contrast, in a case where the user access level is less than the specific display access level of the specific part, non-display of the specific part is determined. The display states of the parts on the HMI screen 17 other than the specific part are determined based on the setting in the access authority information 27. Thereafter, processing in step S180 is performed.

A specific example will be described. A case where login is performed with the username "USER02" in the web browser name "B2_1" and the HMI screen "G12" is opened will be described. As illustrated in FIG. 3, the user access level of the username "USER02" is "3000". As illustrated in FIG. 4, the display access level of the HMI screen "G12" is "5000". In other words, the user access level "3000" of USER02 is less than the display access level "5000" of G12. However, in the exceptional access authority information 28, the specific display access level "1" is set to the specific part "2_PL" of G12. The user access level "3000" of USER02 is greater than or equal to the specific display access level "1" of the specific part "2_PL". Therefore, display of the specific part "2_PL" is determined. Accordingly, it is determined that only the specific part "2_PL" is displayed on the HMI screen "G12", and the parts other than the specific part "2_PL" are not displayed.

In step S150 described above, in a case where the specific display access level about the specific part on the HMI screen 17 is not set in the exceptional access authority information 28, processing in step S170 is performed. In step S170, non-display of the HMI screen 17 is determined. Thereafter, processing in step S180 is performed.

In step S180, it is determined whether at least one part on the HMI screen 17 is displayed. In a case where a determination condition is established, processing in step S210 is performed. In contrast, in a case where the determination condition is not established, an error message is displayed on the web browser 16 without displaying the HMI screen 17. The routine then ends.

In steps S210 to S330, the web browser processing unit 12 determines whether to draw the parts displayed on the HMI screen 17 in an operable state or in an inoperable state, based on the specific operation access level set in the access authority information 27. Processing in and after step S210 is performed on the parts determined to be displayed on the HMI screen by the processing in steps S110 to S170, and is not performed on the parts not displayed.

In step S210, the web browser processing unit 12 refers to the access authority information 27, and compares the user access level of the login user with the operation access level of the HMI screen 17. In a case where the user access level is greater than or equal to the operation access level of the HMI screen 17, processing in step S220 is performed.

In step S220, the web browser processing unit 12 determines whether the information about the specific part on the HMI screen 17 is set in the exceptional access authority information 28. In a case where the specific operation access level about the specific part on the HMI screen 17 is set in the exceptional access authority information 28, processing in step S230 is performed.

In step S230, the web browser processing unit 12 preferentially adopts the specific operation access level of the specific part rather than the operation access level of the HMI screen 17. More specifically, the web browser processing unit 12 compares the user access level with the specific operation access level of the specific part on the HMI screen 17. In a case where the user access level is greater than or equal to the specific operation access level of the specific part, drawing of the specific part in the operable state is determined. In contrast, in a case where the user access level is less than the specific operation access level of the specific part, drawing of the specific part in the inoperable state is determined. The drawing states of the parts on the HMI screen 17 other than the specific part are determined based on the setting in the access authority information 27. Thereafter, processing in step S310 is performed.

A specific example will be described (description of display access level is omitted to simplify description). A case where login is performed with the username "USER01" in the web browser name "B1_1" and the HMI screen "G11" is opened will be described. As illustrated in FIG. 3, the user access level of the username "USER01" is "5000". As illustrated in FIG. 4, the operation access level of the HMI screen "G11" is "5000". In other words, the user access level "5000" of USER01 is greater than or equal to the operation access level "5000" of G11. Further, in the exceptional access authority information 28, the specific operation access level "1" is set to the specific part "1_PL" of G11. The user access level "5000" is greater than or equal to the specific operation access level "1" of the specific part "1_PL". Therefore, drawing of the specific part "1_PL" in the operable state is determined. Further, the drawing states of the parts in the HMI screen "G11" other than the specific part "1_PL" are determined based on the setting in the access authority information 27. Accordingly, it is determined that all of the parts displayed in the HMI screen "G11" are drawn in the operable state.

In step S220 described above, in a case where the specific operation access level about the specific part on the HMI screen 17 is not set in the exceptional access authority information 28, processing in step S240 is performed. In step S240, it is determined that all of the parts displayed in the HMI screen 17 are drawn in the operable state.

Further, in step S210 described above, in a case where the user access level is less than the operation access level of the HMI screen 17, processing in step S250 is performed.

In step S250, the web browser processing unit 12 determines whether the information about the specific part on the HMI screen 17 is set in the exceptional access authority information 28. In a case where the information about the specific part on the HMI screen 17 is set in the exceptional access authority information 28, processing in step S260 is performed.

In step S260, the web browser processing unit 12 preferentially adopts the specific operation access level of the specific part rather than the operation access level of the HMI screen 17. More specifically, the web browser processing unit 12 compares the user access level with the specific operation access level of the specific part on the HMI screen 17. In a case where the user access level is greater than or equal to the specific operation access level of the specific part, drawing of the specific part in the operable state is determined. In contrast, in a case where the user access level is less than the specific operation access level of the specific part, drawing of the specific part in the inoperable state is determined. The drawing states of the parts on the HMI screen 17 other than the specific part are determined based on the setting in the access authority information 27. Thereafter, processing in step S310 is performed.

A specific example will be described (description of display access level is omitted to simplify description). A case where login is performed with the username "USER02" in the web browser name "B2_1" and the HMI screen "G11" is opened will be described. As illustrated in FIG. 3, the user access level of the username "USER02" is "3000". As illustrated in FIG. 4, the operation access level of the HMI screen "G11" is "5000". In other words, the user access level "3000" of USER02 is less than the operation access level "5000" of G11. However, in the exceptional access authority information 28, the specific operation access level "1" is set to the specific part "1_PL" of G11. The user access level "3000" of USER02 is greater than or equal to the specific operation access level "1" of the specific part "2_PL". Therefore, drawing of the specific part "1_PL" in the operable state is determined. Further, the drawing states of the parts in the HMI screen "G11" other than the specific part "1_PL" are determined based on the setting in the access authority information 27. Accordingly, it is determined that, in the HMI screen "G11", only the specific part "1_PL" is drawn in the operable state, and the parts other than the specific part "1_PL" are drawn in the inoperable state.

In step S250 described above, in a case where the specific operation access level about the specific part on the HMI screen 17 is not set in the exceptional access authority information 28, processing in step S270 is performed. In step S270, it is determined that all of the parts displayed in the HMI screen 17 are drawn in the inoperable state. Thereafter, the routine ends.

In step S310, the web browser processing unit 12 refers to the access authority information 27, and determines whether the web browser 16 is permitted to operate the HMI screen 17. In a case where the web browser 16 is permitted to operate the HMI screen 17, processing in step S320 is performed.

In step S320, the web browser processing unit 12 adopts a result of the processing in step S230, S240, or S260, and finally determines the drawing states (operable state/inoperable state) of the respective parts displayed in the HMI screen 17. Thereafter, the routine ends, and the HMI screen 17 is then drawn on the web browser 16.

In step S310 described above, in a case where the web browser 16 is not permitted to operate the HMI screen 17, processing in step S330 is performed. In step S330, the web browser processing unit 12 finally determines to draw all of the parts displayed in the HMI screen 17, in the inoperable state irrespective of the result of the processing in steps S230, S240, and S260. Thereafter, the routine ends, and the HMI screen 17 is drawn on the web browser 16.

4. Effects

As described above, in the SCADA web HMI system 1 according to the present embodiment, in principle, the operation authority can be set to each of the web browsers 16 in units of HMI screens, and the operation authority can be set to each of the users in units of HMI screens. This makes it possible to manage the display states and the operation states of the HMI screens by combining the conditions of both of the web browser (operation place) and the user. Further, as an exception, the operation authority of the specific part on each of the HMI screens can be set in units of parts.

5. Modifications

The processing about the display access level (steps S110 to S180) in the above-described flowchart in FIG. 6 can be omitted. In this case, display of all of the parts on the HMI screen is permitted, and it is determined whether to draw each of the parts on the HMI screen in the operable state or in the inoperable state, by the processing in and after step S210.

Further, in FIG. 5 and FIG. 6 described above, the setting about operation permission/prohibition for each of the web browser names in the exceptional access authority information 28 may be different from the setting in the access authority information 27. In this case, the setting in the exceptional access authority information 28 is preferentially adopted.

Further, in the above-described embodiment, the SCADA web HMI system 1 that has the client-server configuration including the HMI client devices 10 and the HMI server device 20 has been described; however, the system configuration is not limited thereto. The SCADA web HMI system 1 may have a standalone configuration in which a server function and a client function are provided in a single device. In other words, the processing by the web browser processing unit 12, the PLC signal processing unit 21, and the web server processing unit 22 illustrated in FIG. 2 described above may be performed by a single device.

6. Hardware Configuration Example

FIG. 7 is a block diagram illustrating a hardware configuration example of the HMI server device 20 and one HMI client device 10.

The processing of each of the above-described HMI server device 20 is realized by a processing circuit. The processing circuit includes the processor 61, the memory 62, and a network interface 63 that are connected to one another. The processor 61 realizes the functions of the HMI server device 20 by executing various kinds of programs stored in the memory 62. The memory 62 includes a main storage device and an auxiliary storage device. The memory 62 previously stores the login information 24, the SVG file 25, the part library 26, the access authority information 27, and the exceptional access authority information 28, all described above. The network interface 63 is communicably connected to other devices in the same network through the information LAN 3.

The processing of each of the above-described HMI client devices 10 is realized by a processing circuit. The processing circuit includes the processor 71, the memory 72, a network interface 73, an input interface 74, and the monitor 15 that are connected to one another. The processor 71 realizes the functions of the HMI client device 10 by executing various kinds of programs stored in the memory 72. The memory 72 includes a main storage device and an auxiliary storage device. The network interface 73 is communicably connected to other devices in the same network through the information LAN 3. The input interface 74 is a set of input devices including a keyboard, a mouse, a touch panel, and the like.

Although the embodiment of the present invention has been described above, the present invention is not limited to the above-described embodiment, and can be variously modified and implemented without departing from the spirit of the present invention. When numerals of the number, the quantity, the amount, the range, and the like of each of the elements are mentioned in the above-described embodiment, the present invention is not limited to the mentioned numerals except for the case of being particularly clearly mentioned and the case of being obviously specified to the numerals in principle. Further, the structure and the like described in the above-described embodiment are not necessarily essential for the present invention except for the case of being particularly clearly mentioned and the case of being obviously specified to the structure and the like in principle.

REFERENCE SIGNS LIST

1 SCADA web HMI system
2 Programmable logic controller (PLC)

3 Information LAN
10, 10*a*, 10*b* HMI client device (HMI client apparatus)
11, 11*a*, 11*b* Processing unit
12, 12*a*, 12*b* Web browser processing unit
15, 15*a*, 15*b* Monitor
16, 16*a*, 16*b* Web browser
17, 17*a*, 17*b* HMI Screen
20 HMI server device (HMI server apparatus)
21 PLC signal processing unit
22 Web server processing unit
24 Login information
25 SVG file
26 Part library
27 Access authority information
28 Exceptional access authority information
61 Processor
62 Memory
63 Network interface
71 Processor
72 Memory
73 Network interface
74 Input interface

The invention claimed is:

1. A Supervisory Control And Data Acquisition (SCADA) web Human Machine Interface (HMI) client device executing at least one web browser communicating with a web server, the SCADA web HMI client device comprising a processor, a memory, and a monitor, wherein the memory stores a user access level corresponding to a login user, image data for an HMI screen for supervising an industrial plant, and screen access authority information, all received from the web server, the screen access authority information including an operation access level of the HMI screen and operation permission/prohibition of the HMI screen by the web browser, the processor is configured to execute the web browser displayed on the monitor, to draw the HMI screen in an operable state on the web browser in a case where the user access level is greater than or equal to the operation access level of the HMI screen and where operation of the HMI screen by the web browser is permitted, and the processor is configured to draw the HMI screen in an inoperable state on the web browser in a case where the user access level is less than the operation access level of the HMI screen or operation of the HMI screen by the web browser is not permitted.

2. The SCADA web HMI client device according to claim 1, wherein the memory further stores exceptional access authority information, the exceptional access authority information including a specific operation access level of a specific part on the HMI screen, the specific part being a part of a plurality of parts on the HMI screen, and the processor is configured to draw the specific part in the operable state on the web browser and to draw parts other than the specific part among the plurality of parts in the inoperable state on the web browser, in a case where the user access level is less than the operation access level of the HMI screen, and where the user access level is greater than or equal to the specific operation access level of the specific part, and where operation of the HMI screen by the web browser is permitted.

3. The SCADA web HMI client device according to claim 1, wherein the screen access authority information further includes a display access level of the HMI screen, the processor is configured to prohibit drawing of the HMI screen on the web browser in a case where the user access level is less than the display access level of the HMI screen, the processor is configured to draw the HMI screen in the operable state on the web browser in a case where the user access level is greater than or equal to the display access level of the HMI screen, and where the user access level is greater than or equal to the operation access level of the HMI screen, and where operation of the HMI screen by the web browser is permitted, and the processor is configured to draw the HMI screen in the inoperable state on the web browser in a case where the user access level is greater than or equal to the display access level of the HMI screen, and where the user access level is less than the operation access level of the HMI screen or operation of the HMI screen by the web browser is not permitted.

4. The SCADA web HMI client device according to claim 3, wherein the memory further stores exceptional access authority information, the exceptional access authority information including a specific display access level of a specific part on the HMI screen, the specific part being a part of a plurality of parts on the HMI screen, and the processor is configured to draw, on the web browser, the specific part in an operation state based on the operation access level of the HMI screen and the operation permission/prohibition of the HMI screen by the web browser and to prohibit drawing of parts other than the specific part among the plurality of parts on the web browser, in a case where the user access level is less than the display access level of the HMI screen and where the user access level is greater than or equal to the specific display access level of the specific part.

5. A Supervisory Control And Data Acquisition (SCADA) web Human Machine Interface (HMI) system, comprising:

an HMI server device configured to execute a web server; and an HMI client device configured to execute at least one web browser communicating with the web server, wherein the HMI server device includes a server processor and a server memory, the server memory stores login information, image data for an HMI screen for supervising an industrial plant, and screen access authority information, the login information including a user access level corresponding to a login username, the screen access authority information including an operation access level of the HMI screen and operation permission/prohibition of the HMI screen by the web browser, the server processor is configured to execute the web server that transmits the user access level corresponding to the login username, the image data, and the screen access authority information to the web browser, in response to a login request including the login username from the web browser, the HMI client device includes a client processor, a client memory, and a monitor, the client memory stores the user access level corresponding to the login user, the image data, and the screen access authority information, all received from the web server, and the client processor is configured to execute the web browser displayed on the monitor, the client processor is configured to draw the HMI screen in an operable state on the web browser in a case where the user access level is greater than or equal to the operation access level of the HMI screen and where operation of the HMI screen by the web browser is permitted, and the client processor is configured to draw the HMI screen in an inoperable state on the web browser in a case where the user access level is less than the operation access level of the HMI screen or operation of the HMI screen by the web browser is not permitted.

6. The SCADA web HMI system according to claim 5, wherein the client memory further stores exceptional access authority information, the exceptional access authority information including a specific operation access level of a specific part on the HMI screen, the specific part being a part of a plurality of parts on the HMI screen, and the client processor is configured to draw the specific part in the operable state on the web browser and to draw parts other than the specific part among the plurality of parts in the inoperable state on the web browser, in a case where the user access level is less than the operation access level of the HMI screen, and where the user access level is greater than or equal to the specific operation access level of the specific part, and where operation of the HMI screen by the web browser is permitted.

7. The SCADA web HMI system according to claim 5, wherein the screen access authority information further includes a display access level of the HMI screen, the client processor is configured to prohibit drawing of the HMI screen on the web browser in a case where the user access level is less than the display access level of the HMI screen, the client processor is configured to draw the HMI screen in the operable state on the web browser in a case where the user access level is greater than or equal to the display access level of the HMI screen, and where the user access level is greater than or equal to the operation access level of the HMI screen, and where operation of the HMI screen by the web browser is permitted, and the client processor is configured to draw the HMI screen in the inoperable state on the web browser in a case where the user access level is greater than or equal to the display access level of the HMI screen, and where the user access level is less than the operation access level of the HMI screen or operation of the HMI screen by the web browser is not permitted.

8. The SCADA web HMI system according to claim 7, wherein the client memory further stores exceptional access authority information, the exceptional access authority information including a specific display access level of a specific part on the HMI screen, the specific part being a part of a plurality of parts on the HMI screen, and the client processor is configured to draw, on the web browser, the specific part in an operation state based on the operation access level of the HMI screen and the operation permission/prohibition of the HMI screen by the web browser and to prohibit drawing of parts other than the specific part among the plurality of parts on the web browser, in a case where the user access level is less than the display access level of the HMI screen and wherein the user access level is greater than or equal to the specific display access level of the specific part.

* * * * *